United States Patent
Lu et al.

(10) Patent No.: US 12,437,522 B2
(45) Date of Patent: Oct. 7, 2025

(54) ADAPTING LEARNED CARDINALITY ESTIMATORS TO DATA AND WORKLOAD DRIFTS

(71) Applicant: MICROSOFT TECHNOLOGY LICENSING, LLC, Redmond, WA (US)

(72) Inventors: Yao Lu, Redmond, WA (US); Srikanth Kandula, Redmond, WA (US); Beibin Li, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 905 days.

(21) Appl. No.: 17/566,996

(22) Filed: Dec. 31, 2021

(65) Prior Publication Data

US 2023/0215150 A1  Jul. 6, 2023

(51) Int. Cl.
*G06V 10/776* (2022.01)
*G06N 3/045* (2023.01)
*G06V 10/774* (2022.01)

(52) U.S. Cl.
CPC ........... *G06V 10/776* (2022.01); *G06N 3/045* (2023.01); *G06V 10/7747* (2022.01)

(58) Field of Classification Search
CPC .. G06V 10/776; G06V 10/7747; G06N 3/045; G06N 3/0455; G06N 3/094; G06N 3/088; G06N 3/0475; G06N 20/00
See application file for complete search history.

(56) References Cited

U.S. PATENT DOCUMENTS

| | | | | |
|---|---|---|---|---|
| 6,108,648 | A * | 8/2000 | Lakshmi | G06F 16/24545 |
| 10,942,923 | B1 * | 3/2021 | Zhang | G06N 3/047 |
| 11,625,398 | B1 * | 4/2023 | Bhuyan | G06F 16/24544 |
| | | | | 707/714 |
| 11,720,565 | B2 * | 8/2023 | Kalil | G06F 16/24537 |
| | | | | 707/714 |
| 2002/0198867 | A1 * | 12/2002 | Lohman | G06F 16/24545 |
| 2004/0128287 | A1 * | 7/2004 | Keller | G06F 16/24545 |
| 2008/0306903 | A1 * | 12/2008 | Larson | G06F 16/2462 |
| 2015/0248467 | A1 * | 9/2015 | Buteau | G06F 16/2453 |
| | | | | 707/625 |
| 2016/0260011 | A1 * | 9/2016 | Corvinelli | G06F 16/2455 |
| 2017/0323200 | A1 * | 11/2017 | Corvinelli | G06N 3/048 |
| 2018/0329951 | A1 * | 11/2018 | Yu | G06N 20/00 |

(Continued)

OTHER PUBLICATIONS

Halford, Max, Philippe Saint-Pierre, and Franck Morvan. "Selectivity correction with online machine learning." arXiv preprint arXiv:2009.09884 (2020).*

(Continued)

*Primary Examiner* — Xuemei G Chen
(74) *Attorney, Agent, or Firm* — Han Gim; Newport IP, LLC

(57) ABSTRACT

A method of updating a trained cardinality estimation model includes receiving a cardinality estimation model with cardinality labels and detecting a drift in underlying data or predicates of the cardinality estimation model. The type of the detected drift is determined and new test queries that mimic test queries for the detected drift are synthesized. A portion of the synthesized test queries is selected to reduce annotation cost and used to update the cardinality estimation model.

20 Claims, 7 Drawing Sheets

(56) References Cited

U.S. PATENT DOCUMENTS

| | | | |
|---|---|---|---|
| 2018/0329955 A1* | 11/2018 | Chaudhuri | G06F 16/24545 |
| 2019/0303475 A1* | 10/2019 | Jindal | G06F 16/24545 |
| 2020/0379963 A1* | 12/2020 | Lopes | G06F 16/24542 |
| 2021/0056108 A1* | 2/2021 | Shmueli | G06N 3/08 |
| 2021/0089532 A1* | 3/2021 | Patel | G06F 16/217 |
| 2021/0263932 A1* | 8/2021 | Shaffer | G06F 16/9024 |
| 2021/0263935 A1* | 8/2021 | Hertzschuch | G06F 16/24549 |
| 2021/0406744 A1* | 12/2021 | Dutt | G06F 16/24545 |
| 2022/0067045 A1* | 3/2022 | Kalil | G06F 16/24545 |
| 2022/0164346 A1* | 5/2022 | Mitra | G06N 7/01 |

OTHER PUBLICATIONS

Zhu, Rong, et al. "FLAT: fast, lightweight and accurate method for cardinality estimation." arXiv:2011.09022v5 [cs.DB] May 19, 2021.*

"International Search Report and Written Opinion Issued in PCT Application No. PCT/US22/051893", Mailed Date: Mar. 20, 2023, 13 Pages.

"TPC-H Vesion 2 and Version 3", Retrieved from: https://web.archive.org/web/20210415131313/http://tpc.org/tpch/, Apr. 15, 2021, 2 Pages.

Bruno, et al., "STHoles: A Multidimensional Workload-Aware Histogram", In Proceedings of the ACM SIGMOD International Conference on Management of Data, May 21, 2001, pp. 211-222.

Chaudhuri, Surajit, "An Overview of Query Optimization in Relational Systems", In Proceedings of the Seventeenth ACM SIGACT-SIGMOD-SIGART Symposium on Principles of Database Systems, May 1, 1998, pp. 34-43.

Choi, et al., "Self-ensembling With Gan-based Data Augmentation for Domain Adaptation in Semantic Segmentation", In Proceedings of the IEEE/CVF International Conference on Computer Vision, Sep. 2, 2019, pp. 6830-6840.

Ding, et al., "ALEX: An Updatable Adaptive Learned Index", In Proceedings of the ACM SIGMOD International Conference on Management of Data, Jun. 14, 2020, pp. 969-984.

Ditzler, et al., "Learning in Nonstationary Environments: A Survey", In Journal of IEEE Computational Intelligence Magazine, vol. 10, Issue 4, Nov. 2015, pp. 12-25.

Dutt, et al., "Efficiently approximating selectivity functions using low overhead regression models", In Proceedings of the VLDB Endowment, vol. 13, Issue 12, Jul. 1, 2020, pp. 2215-2228.

Dutt, et al., "Selectivity Estimation for Range Predicates Using Lightweight Models", In Proceedings of the VLDB Endowment, vol. 12, Issue 9, May 1, 2019, pp. 1044-1057.

Fan, et al., "Relational Data Synthesis Using Generative Adversarial Networks: A Design Space Exploration", In Repository of arXiv:2008.12763v1, Aug. 28, 2020, 20 Pages.

Felzenszwalb, et al., "A Discriminatively Trained, Multiscale, Deformable Part Model", In Proceedings of IEEE conference on computer vision and pattern recognition, Jun. 23, 2008, pp. 1-8.

Gama, et al., "A Survey on Concept Drift Adaptation", In Journal of ACM Computing Surveys, vol. 46, Issue 4, Article 44, Mar. 2014, 37 Pages.

Getoor, et al., "Selectivity Estimation using Probabilistic Models", In Proceedings of the ACM SIGMOD International Conference on Management of Data, May 21, 2001, 12 Pages.

Goodfellow, et al., "Deep Learning", In Publication of MIT Press, Nov. 10, 2016, 802 Pages.

Goodfellow, et al., "Generative Adversarial Nets", In Journal of Advances in Neural Information Processing Systems, vol. 27, Jun. 10, 2014, 9 Pages.

Guo, et al., "Long Text Generation via Adversarial Training With Leaked Information", In Repository of arXiv:1709.08624v1, Sep. 24, 2017, 14 Pages.

Haynes, et al., "Visual Road: A Video Data Management Benchmark", In Proceedings of the International Conference on Management of Data, Jun. 30, 2019, pp. 972-987.

Hilprecht, et al., "DeepDB: Learn From Data, Not From Queries!", In Repository of arXiv:1909.00607v1, Sep. 2, 2019, 13 Pages.

Hoffman, et al., "Cycada: Cycle-Consistent Adversarial Domain Adaptation", In Proceedings of the 35th International Conference on Machine Learning, Jul. 3, 2018, 10 Pages.

Hong, et al., "Conditional Generative Adversarial Network for Structured Domain Adaptation", In Proceedings of the IEEE Conference on Computer Vision and Pattern Recognition, Dec. 17, 2018, pp. 1335-1344.

Zhu, Xiaojin, "Semi-Supervised Learning Literature Survey", In Technical Report of University of Wisconsin-Madison Department of Computer Sciences, Sep. 7, 2005, 39 Pages.

Karras, et al., "A Style-Based Generator Architecture for Generative Adversarial Networks", In Proceedings of the IEEE/CVF Conference on Computer Vision and Pattern Recognition, Mar. 29, 2019, pp. 4401-4410.

Kipf, et al., "Learned Cardinalities: Estimating Correlated Joins With Deep Learning", In Repository of arXiv:1809.00677V1, Sep. 3, 2018, 6 Pages.

Kraska, et al., "The Case for Learned Index Structures", In Proceedings of the International Conference on Management of Data, Jun. 10, 2018, pp. 489-504.

Krizhevsky, et al., "ImageNet Classification with Deep Convolutional Neural Networks", In Journal of Advances in Neural Information Processing Systems, vol. 25, Dec. 3, 2012, 9 Pages.

Zhang, et al., "Adversarial Feature Matching for Text Generation", In Proceedings of the 34th International Conference on Machine Learning, vol. 70, Aug. 2017, 10 Pages.

Kumar, et al., "Melgan: Generative Adversarial Networks for Conditional Waveform Synthesis", In Proceedings of 33rd Conference on Neural Information Processing Systems, Dec. 8, 2019, 12 Pages.

Li, et al., "Perceptual Generative Adversarial Networks for Small Object Detection.", In Proceedings of the IEEE Conference on Computer Vision and Pattern Recognition, Jun. 20, 2017, pp. 1222-1230.

Lu, et al., "Accelerating Machine Learning Inference with Probabilistic Predicates", In Proceedings of the International Conference on Management of Data, Jun. 10, 2018, pp. 1493-1508.

Lu, et al., "Recommender System Application Developments: A Survey", In Journal of Decision Support Systems, vol. 74, Jun. 1, 2015, 38 Pages.

Ma, et al., "Active Learning for ML Enhanced Database Systems", In Proceedings of the ACM SIGMOD International Conference on Management of Data, Jun. 11, 2020, pp. 175-191.

Frid-Adar, et al., "GAN-based Synthetic Medical Image Augmentation for Increased CNN Performance in Liver Lesion Classification", In Journal of Neurocomputing, vol. 321, Dec. 10, 2018, 10 Pages.

Manning, et al., "Foundations of statistical natural language processing", In Publications of MIT Press, May 1999, 353 Pages.

Marcus, et al., "Neo: A Learned Query Optimizer", In Proceedings of the VLDB Endowment, vol. 12, Issue 1, Sep. 2018, pp. 1705-1718.

Muller, et al., "Improved selectivity estimation by combining knowledge from sampling and synopses", In Proceedings of the VLDB Endowment, vol. 11, Issue 9, May 1, 2018, pp. 1016-1028.

Nguyen, et al., "Active Learning Using Pre-Clustering", In Proceedings of The Twenty-First International Conference on Machine Learning, Jul. 4, 2004, 8 Pages.

Ratner, et al., "Snorkel: Fast Training Set Generation For Information Extraction", In Proceedings of the ACM International Conference on Management of Data, May 14, 2017, pp. 1683-1686.

Sandfort, et al., "Data Augmentation Using Generative Adversarial Networks (cycleGAN) to Improve Generalizability in CT Segmentation Tasks", In Journal of Scientific Reports, vol. 9, Issue 1, Nov. 15, 2019, 9 Pages.

Fruhwirth-Schnatter, Sylvia, "Data Augmentation and Dynamic Linear Models", In Journal of Time Series Analysis, Mar. 15, 1994, 18 Pages.

Settles, Burr, "Active Learning Literature Survey", In Technical Report 1648 of Computer Sciences, University of Wisconsin-Madison, Jan. 2009, 67 Pages.

(56) References Cited

OTHER PUBLICATIONS

Shrivastava, et al., "Training region-based object detectors with online hard example mining", In Proceedings of IEEE Conference on Computer Vision and Pattern Recognition, Jun. 27, 2016, pp. 761-769.

Simrad, Patricey., "Best Practices for Convolutional Neural Networks Applied to Visual Document Analysis", In Proceedings of the Seventh International Conference on Document Analysis and Recognition, Aug. 6, 2003, 6 Pages.

Tulyakov, et al., "Mocogan: Decomposing Motion and Content for Video Generation", In Proceedings of the IEEE Conference on Computer Vision and Pattern Recognition, Jul. 17, 2017, pp. 1526-1535.

Tzoumas, et al., "Efficiently adapting graphical models for selectivity estimation", In the Journal of VLDB, vol. 22, Issue 1, Feb. 2013, pp. 3-27.

Wang, et al., "Are We Ready for Learned Cardinality Estimation", In Proceedings of the VLDB Endowment, vol. 14, Sep. 2020, pp. 1640-1654.

Wang, et al., "Low-shot learning from imaginary data", In Proceedings of the IEEE Conference on Computer Vision and Pattern Recognition, Jun. 18, 2018, pp. 7278-7286.

Wold, et al., "Principal component analysis", In Journal of Chemometrics and intelligent laboratory systems, vol. 2, Issue 1-3, Aug. 1987, pp. 37-52.

Yan, et al., "Fast Approximate Spectral Clustering", In Proceedings of the 15th ACM SIGKDD International Conference on Knowledge Discovery and Data Mining, Jun. 28, 2009, pp. 907-916.

Yang, et al., "Deep Unsupervised Cardinality Estimation", In Proceedings of the VLDB Endowment, vol. 13, No. 1, Sep. 2019, pp. 279-292.

Yu, et al., "Automatic Speech Recognition", In Publication of Springer, 2016, 330 Pages.

International Preliminary Report on Patentability received for PCT Application No. PCT/US2022/051893, Jul. 11, 2024, 08 pages.

\* cited by examiner

ADAPTING LEARNED CARDINALITY ESTIMATORS TO DATA AND WORKLOAD DRIFTS

BACKGROUND

Machine learning is increasingly being utilized to perform a variety of tasks in various environments where patterns and inferences may be used in place of explicit programming. Machine learning models become unreliable and have uncertain efficacy when evaluated in conditions that differ from those that the models were trained upon. However, updating the models may require training sets of thousands of queries, which can be costly and has high latency.

It is with respect to these considerations and others that the disclosure made herein is presented.

SUMMARY

Learned cardinality estimation (CE) models may be used in query optimizers and other applications. Examples include learned models (LM) and multi-set constitutional neural networks (MSCN). Such models are typically trained over a corpus of (predicate, cardinality) pairs for each relation and aim to estimate the cardinality for a given, possibly unseen, predicate. These models may provide accuracy on predicates that are similar to those used in training. However, changes to the underlying data or to the predicates may cause drops in accuracy.

Disclosed herein is a system that provides an improvement to a previously trained cardinality estimation model in the context of data and workload drifts. The disclosed embodiments allow determination of when to detect that an update is needed, detection of the type of drift, and efficient generation and/or selection of new queries and cardinality labels to allow for a cost-efficient way to maintain model quality. In some embodiments, generated queries from a Generative Adversarial Network (GAN) may be used when there are insufficient new queries or when there are too many new queries to save on annotation overhead.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1:
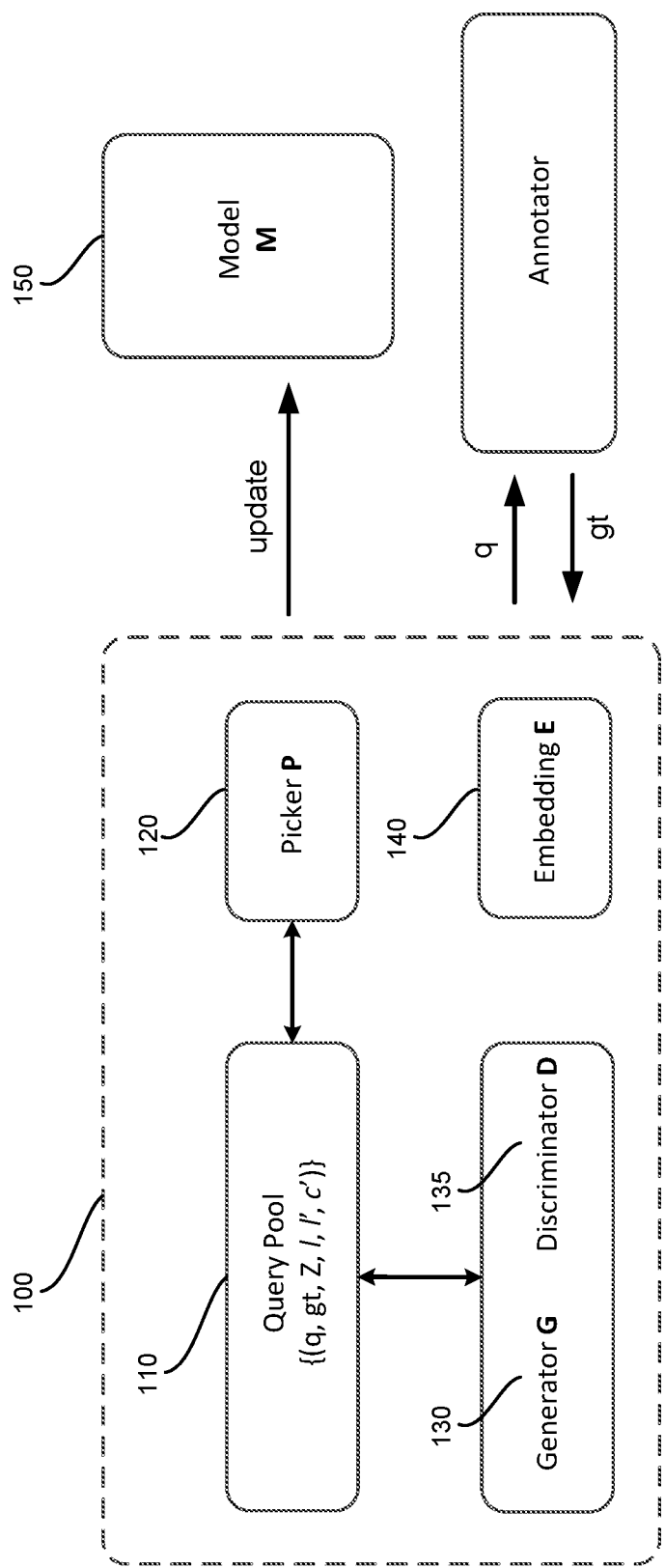
FIG. 1 is a diagram illustrating the disclosed techniques according to one embodiment disclosed herein.

Referring to the appended drawings, in which like numerals represent like elements throughout the several FIGURES, aspects of various technologies for improved training data will be described. In the following detailed description, references are made to the accompanying drawings that form a part hereof, and which are shown by way of illustrating specific configurations or examples.

The present disclosure describes a machine learning system that improves a previously trained cardinality estimation model in the context of data and workload drifts. To respond to changes in data or predicate workload, prior solutions update the models by re-training or fine-tuning using newly drawn (predicate, cardinality) pairs. Since these models require training sets of thousands of queries, re-obtaining the updated training corpus can be costly and have high latency. If only the data changes, the ground-truth cardinality labels will have to be recomputed. Furthermore, when the test predicate workload changes, the models may have to wait until enough new queries appear. The net result is that model adaptation is slow and expensive. Meanwhile, poor cardinality estimates can lead to imperfect plan choices and can degrade the query performance.

An adaptation technique in accordance with the present disclosure may satisfy the following requirements. First, the costs to adapt models should be small relative to the benefits. Second, different scenarios may require different adaptations. For example, when only the data changes, i.e., the query workload is stable, a key objective is to determine which ground truth cardinality labels to re-obtain so as to keep costs low when obtaining fresh training pairs. When test queries change and only limited examples are available, a desirable objective is how to generate more examples that mimic the new workload. Finally, a desirable objective is determining when or how often the model should be updated and how the examples should be used, as the examples may possibly have inaccurate ground-truth and are possibly no longer representative of the arrival predicate workload.

The disclosed embodiments incorporate aspects of a Generative Adversarial Network (GAN), which is a generator that aims to synthesize examples that are indistinguishable from the observed test predicates and an adversarial discriminator that distinguishes the synthetic examples from those that were actually observed. Both may be trained in an adversarial game. The disclosed embodiments may include a picker function that predicts which input queries are more useful to update the CE model and reduces costs by only annotating, fetching up-to-date ground truth cardinality labels for those queries. While the disclosed embodiments are described in the example of query optimizers, the described principles may generally be applicable to other models that require queries and/or query results as input.

An example system in accordance with the present disclosure may take as input queries from the test workload and a CE model that has been trained from workload history. The disclosed system may identify the nature of the drift that is underway, learn to generate additional queries if necessary, and provide data for updating the CE model. The output may be used to general an improved CE model that is more accurate on the test workload. The disclosed embodiments may be agnostic to and use the underlying CE model as a black box. The disclosed system does not modify the model's structure, hyper-parameters, etc. The only change is to the inputs that the CE model trains over. Improvements may accrue from generating and labeling useful examples so that the CE model adapts more quickly.

An example system in accordance with the present disclosure considers cardinality estimation (CE) models which answer queries of the following type:

SELECT count(*)
FROM T
WHERE $l_1 \leq Col_1 \leq u_1$ AND ... $l_i \leq Col_i \leq u_i$ ...

Data drift may refer to changes to the underlying dataset that the predicates apply over, e.g., inserts, appends, deletes, or updates to rows. Adaptation techniques may solve these problems as follows: (1) determine when the model must change, (2) acquire new training examples, e.g., predicates and cardinality labels, that more closely resemble future workload, (3) figure out how to combine new examples with the previous training examples that are possibly inaccurate, and (4) update the existing model using these examples.

One way to update models is by fine-tuning which refers to training the model for a few more epochs with the updated workload. Re-training refers to training the model (with the same structure and hyperparameters) from scratch over the updated workload. Acquiring up-to-date training examples includes identifying new queries and obtaining up-to-date ground-truth cardinality labels for them.

Given a CE model M that is previously trained from workload history and a few example queries from the test workload (along with their ground truth cardinality if available), the disclosed embodiments allow for adapting the CE model to data and workload drifts quickly and using fewer resources.

The objectives of the disclosed adaptation method include:
  Accelerated adaptation, i.e., achieve the same accuracy quickly,
  Use a lesser amount of additional resources,
  Support a wide variety of CE models and,
  Cover a wide scope of drifts with a unified solution.

The table below shows example types of drifts that can be supported by the disclosed embodiments.

| | Drift | gen? | pick? | update? | Note |
|---|---|---|---|---|---|
| c1 | Data | x | ✓ | ✓ | Known workload, slow label update. |
| c2 | Wkld | ✓ | ✓ | ✓ | Inadequate test queries. |
| c3 | Wkld | x | ✓ | ✓ | Slow labeling, can happen with c2. |
| c4 | Wkld | x | x | ✓ | Adequate labeled queries. |

In an embodiment, drifts may be adapted to periodically. At each period, where zero, one, or more kinds of drifts may be occurring, the disclosed techniques enable detection of the type of drift that is underway (see process below) and adapt to the drift as follows. The inputs may include a CE model M and queries with cardinality labels if available from the new workload. In other embodiments, drifts may be adapted to based on a trigger such as a notification or other indication.

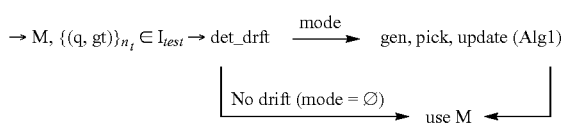

gen: when there are inadequate test queries to update M, additional queries may be synthesized that mimic the test examples.
pick: when labeling cannot keep up or has high costs, resource use may be conserved by selecting useful queries to annotate.
update: M may be updated with labeled queries.

With reference to FIG. 1, illustrated is an example architecture 100 according to some embodiments. The query pool 110 maintains tuples of (q, gt, l, l', c', z), in which q is a predicate with ground truth cardinality gt, l denotes the source of the predicate which can be a prior training workload, the test workload or synthesized (l=train, test, gen) and the other parameters are defined next.

The generator G 130 and the discriminator D 135 comprise a GAN; together, they emit synthetic queries. l' is D's prediction of the predicate source and c' is the confidence score.

The picker P 120 performs a weighted sampling over a given set of predicates.

E 140 is a helper that embeds predicates q into a different space z which other components rely on.

Detection of drifts: Prior learned database components use evaluation feedback or update periodically whenever enough new queries are available. Embodiments of the present disclosure use evaluation feedback as follows: det_drft triggers when the evaluation error of the current CE model 150 on the test queries exceeds by more than a threshold π beyond the error observed during training. Thus, the disclosed embodiments adapt only when drifts cause model accuracy to degrade. If no drift is detected, the current model 150 uses mode=∅.

Identification of drift modes: Each det_drft call also characterizes the drift that is underway as a case referred to as modeflag; thus mode can indicate a data drift c1 and/or a workload drift {c2, c3, c4}. Note that the flag has multiple bits, and more than one kind of drift may be observed at a time.

Data drifts: In data drifts, the cardinality labels for all queries (including those from the training corpus ($I_{train}$)) may be outdated and may be recomputed. To check for data drift D→D', different measures may be used including (1) counting the fraction of rows that are new or have changed since the model was last trained, and (2) measuring the change in ground truth cardinality for a few canary predicates. A data drift sets the c1 bit in the mode flag.

Workload drifts. Workload drifts may be identified as follows: (1) c2 denotes the case when test queries available are inadequate; that is, the number of new queries available ($n_t$) is below γ the number of annotated queries necessary to train a robust CE model. γ may be estimated offline based on the training size when the accuracy of M stabilizes and γ may be tuned online based on evaluation feedback. (2) c3 denotes the case when not enough queries have ground truth labels: $n_g < \gamma$; this can occur because computing the labels is too slow or too expensive or when a query optimizer has what-if queries but lacks ground truth labels. (3) c4 occurs when both queries and ground truth are adequate: $n_t > \gamma$, $n_g > \gamma$. The disclosed embodiments are robust to inaccuracies in estimating γ since the drift type detection repeats in each period. The disclosed embodiments also use a form of early stopping to reduce unnecessary resource usage. With very few test queries, a high evaluation error can be due to variance (e.g., outliers) or due to an actual workload drift; conservatively, the disclosed embodiments flag this case to be a workload drift since it allows for quick reaction and identification and resolution of false positives in subsequent periods.

---

Algorithm 1: Warper procedures in an invocation.

Input : {q, gt} from $I_{test\ test}$, $\mathbb{M}$, $\mathbb{G}$, $\mathbb{D}$, $\mathbb{E}$ from the previous invocation, mode flag from det_drft.
1  push({(q, gt, l=test)});
2  if mode contains c1, c2 or c3:
3      z ← embed(q); //Embed predicates by $\mathbb{E}$.
4      Compute $\mathcal{L}_{AE}$ using q ∈ Pool;
5      if mode contains c2 :
6          while $n_i$--: //Update GAN.
7              $q_{gen}$ ← {gen(z|l = test, $n_s$)}; //Generate by $\mathbb{G}$.
8              Compute $\mathcal{L}_{GAN}$ using $q_{gen}$, q ∈ Pool;
9              $\mathbb{G}$, $\mathbb{E}$, $\mathbb{D}$ ← update_MultiTask($\mathbb{G}$, $\mathbb{E}$, $\mathbb{D}$, $\mathcal{L}_{AE}$ + $\mathcal{L}_{GAN}$);
10             push({$q_{gen}$, l=gen});
11     $\mathbb{G}$, $\mathbb{E}$ ← update_AutoEncoder($\mathbb{G}$, $\mathbb{E}$, $\mathcal{L}_{AE}$);
12     gt ← anno(pick($n_p$)); //Pick by $\mathbb{P}$ and annotate by $\mathbb{A}$.
13     $\mathbb{M}$ ← update($\mathbb{M}$, {q,gt} ∈ Pool); //Update $\mathbb{M}$ in all cases.
Output: Updated $\mathbb{M}$, $\mathbb{G}$, $\mathbb{D}$, $\mathbb{E}$.

---

Adapting to individual drifts. With reference to Algorithm 1 above, newly arrived predicates may be injected into the query pool (line #1). Line #2 discerns the kind of drift, if any. Line #3 computes embeddings for predicates with E. Lines #6-#9 update the generator and discriminator if synthetic queries are needed (c2). n_i is a constant that determines the number of iterations for which the GAN is invoked to generate new synthetic queries. Note also that this and other pseudocodes here use variables such as q and gt to denote either a singleton query and a singleton cardinality label or a set of queries and their associated cardinality labels. For c1, c2 and c3, line #11 updates the embeddings and line #12 picks the queries to use for training and annotation. Note that the annotation method, anno, as a side-effect, updates the ground truth labels in the pool. Finally, line #13 updates the CE model using predicates and labels from the pool for all four cases. Details of the modular calls are further discussed below. Note that some of the calls can be parallelized.

Adapting to complex drifts. When a drift discerns multiple modes, i.e., mode=c1|c2, c2|c3 and so on, the disclosed embodiments combine the mitigation strategies described herein. Algorithm 1 may handle any combination of drifts. For continuous drifts, the disclosed embodiments may repeat the drift detection and adapt periodically. The same adaptation strategy may be used since Algorithm 1 handles cases with multiple simultaneous drifts.

In an embodiment, the query pool may be an in-memory data structure that maintains queries and their labels in {(q, gt, z, l, l', c')} tuples. The query pool may be initialized with $I_{train}$ from the original training workload. Each (q, gt) tuple from $I_{train}$ creates a record in the query pool with empty z, l', c' and l=train. For each adaptation step that calls Algorithm 1, queries from the test workload $I_{test}$ along with their cardinality labels (if available) may be injected into the query pool with l=test. The generator G, when necessary, may generate and inject new records $q_{gen}$ into the query pool with l=gen and gt=-1. Empty fields may be filled using different components (A, E, and D).

The CE Model M may be implemented as a black box and may predict cardinality given a query predicate: q→M→card. Updating the model (Line #13 in Algorithm 1) may involve re-training or fine-tuning the model given a set of examples {q, gt} from the query pool. The initial M input may have been trained offline using {(q, gt)}∈$I_{train}$.

The Embedding E may be learned to transform a query predicate into a compact representation:

$$\text{embed}(q): E(q) \to z.$$

The disclosed embodiments are agnostic to the CE model, and each may use a different featurization, and the disclosed embodiments may leverage learned embeddings of query predicates to decouple different components (i.e., G, D, P) from the featurization used by M. Using predicate embeddings may improve the performance of subsequent modules. In an embodiment, embed( ) may use the ground truth labels (i.e., concatenate to q) whenever they are available and up-to-date.

The Generator G synthesizes new query predicates using the predicate embeddings in the pool:

$$\text{gen}(z,n): \{G(z+\epsilon)\}_n \to q_{gen},$$

where n is the number of predicates that need to be generated, and $\epsilon \sim N(0, \sigma^2)$ is a random Gaussian noise with σ that is equal to the standard deviation of z. G may be a simple NN. Whereas prior generative methods often use random seeds ϵ as input, generating from z+ϵ, where z represents the embedding of the test predicates previously seen, is more likely to land into the real test workload. G may be trained together with the discriminator D to formulate a GAN.

The Discriminator D may be another NN that takes a predicate embedding as input and predicts whether a predicate resembles the training, test, or generated workload: D(z)→l'∈{gen, test, train}, c'. Here, c' is the confidence score associated with the classification.

G and D may update in each invocation using l'; D may be used and updated only in workload drift c2 with inadequate test queries.

The Picker P may use pick(n) to select n queries from the pool; it finds records in the pool that can be more useful to the model M and thus reduces the annotation cost. There are two use cases of P as shown in Algorithm 1 and both diversify the selection based on the available information in different drift cases. (1) For c2 when D is used, P performs a weighted sampling with replacement from all the records in the pool with l'=test based on the confidence score c'. (2) For c1 and c3 in which only the picker is used, P applies sampling stratified over the CE error. Specifically, all records in the pool are clustered with cardinality labels annotated in the previous invocation into k buckets; the clustering is based on the evaluation error when running query predicates through M. Next, for each new query without cardinality labels, it is assigned to one of the buckets based on its k nearest neighbors—NN using its query embedding. Finally, a stratified sampling with replacement picks records from among these different cluster (or buckets).

Three components may be learned: the Embedding E 140, the Generator G 130, and the Discriminator D 135. Training may be formulated such that these components are updated end-to-end using multi-task learning; that is, the loss function consists of two parts:

$$\mathcal{L} = \mathcal{L}_{GAN} + \mathcal{L}_{AE}$$

For the training and update procedure in Algorithm 1, task 1 in Line #4 collects the auto-encoder loss $\mathcal{L}_{AE}$ that is used to update E and G in update_AutoEncoder( ). Next, for c2, the auto-encoder loss and the GAN loss LGAN from task 2 are merged (Line #9) to update E, G, and D in update_MultiTask( ).

Task 1 Auto-encoder: The first task is to train an auto-encoder that consists of the encoder E and the generator G:

$$q, gt \to E \to z \to G \to \hat{q}.$$

gt is an optional input to the embedder and may be set to −1 if unavailable.

The training goal is to minimize the reconstruction (L1) loss between the input query predicate and the recovered one:

$$\mathcal{L}_{AE} = |q - \hat{q}|$$

Training the auto-encoder may follow a standard approach. To compute $\mathcal{L}_{AE}$ (Line #4), all records from the pool may be used regardless of whether ground truth labels are available. Doing so may ensure that the encoder and the generator can generalize to all three cases (i.e., queries from the generator, the training, or the test workload).

Task 2 GAN: When synthetic queries are needed, the second task is to update the generator G together with the discriminator D in a GAN fashion. For each iteration in Lines #6-#9, G generates a set of query predicates $q_{gen}$ as described earlier and D distinguishes them as belonging to one of the following types {gen, test, train}:

$$z + \epsilon \to G \to q_{gen} \to E \to z \to D \to l'.$$

The generator loss is defined by:

$$\mathcal{L}_{gen} = \text{CrossEntropy}(l', l=\text{test}).$$

The goal here is to generate queries as close to the test workload as possible and the discriminator classifies the generated query correctly as test.

$$\text{CrossEntropy}(p, q) = -\Sigma_{x \in X} p(x) \log q(x)$$

is a standard loss function for training classifiers.

On the other hand, the discriminator is trained by classifying the generated queries as well as the existing ones from the pool (Line #9 where inputs can have all three cases of l):

$$q, gt \to E \to z \to D \to l_d.$$

gt is an optional input and may be set to −1 if unavailable.

The discriminator loss is defined by:

$$\mathcal{L}_{discr} = \text{CrossEntropy}(l, l_d),$$

so that the discriminator correctly identifies which workload the given query predicates, including those from the training and test workloads, should belong to. Finally, the GAN loss is a combination of the generator and the discriminator losses:

$$\mathcal{L}_{GAN} = \mathcal{L}_{gen} + \mathcal{L}_{discr}$$

The training simultaneously optimizes $\mathcal{L}_{gen}$ and $\mathcal{L}_{discr}$ so that G and D play against each other and formulate a GAN—minimizing $\mathcal{L}_{gen}$ so that G generates predicates that can be classified as l'=test even though the actual labels for generated queries are l=gen; minimizing $\mathcal{L}_{discr}$ so that D recognizes the generated predicates. Unlike a classic GAN training in which a binary label of {test, gen} is used, we use a three-class label {gen, test, train}, since train is a class not present in classic GANs and can be different from test.

Early stop. The accuracy gain of M after each adaptation step can be used as the stopping criteria; once the gain is less than a small threshold, det_drft for the next invocation uses a larger π, so that the previous CE model is adapted only if a larger loss in accuracy is observed (e.g., due to a new drift). Doing so may save compute cycles, because possible improvements are already small at this point. Early stopping also adds robustness to inaccurate γ and drift type identification.

Further described herein are robustness and fall-back options.

Drift detections: (1) False negatives—in a drift when det_drft does not trigger (i.e., there is a drift but the accuracy gap is small or even negative), the existing CE model can be used and no action is needed. (2) False positives, i.e., when there is a large accuracy gap but no drift, are impossible by definition since an adaptation may help reduce the accuracy gap.

Drift type identifications. For data drifts, the underlying database system should provide reliable signals regarding the number of rows that have changed but noise (e.g., faulty telemetry) can occur: (1) False positives would trigger needless adaptation but the threshold to trigger increases progressively (an adaptation to the noise level). (2) False negatives wherein data drift happens but is not detected will either not result in an accuracy loss (in which case model adaptation is not necessary) or will be identified based on the accuracy loss and will trigger much of the same adaptation steps as would have been encountered were data drift to be detected.

For workload drifts, we know which ground truth labels gt are available from the test workload and we can accurately estimate the rate of computing gt; hence c3, which checks for low or no gt, cannot be confused from c2 or c4. Therefore, with an overestimated γ, det_drft may mark c2 instead of c4 and all the modules are used. In such a scenario, there are adequate queries and cardinality labels; the modules converge quickly leading to an early stop. When γ is underestimated, det_drft yields c4 instead of c2 and the process falls back to updating M directly which is no worse than fine-tuning. Simple heuristics can be also used to tune γ based on runtime feedback such as: when detect_drift yields c4 while the accuracy improves slowly, the value of γ can be increased (see above reasoning which indicates this to be a single that γ has been underestimated). Thus, the disclosed embodiments are robust to γ and are no worse than re-training or fine-tuning.

Adaptation intervals and outliers. Notice that the disclosed embodiments run periodically independent of $n_t$—the number of test queries that are available for any given invocation. When $n_t$ is small, using a mean error estimation for M adds uncertainty since one may not distinguish an actual workload drift from a few outlier queries which, in turn, results in inaccurate control decisions. We note that the early stop and other mechanisms discussed above enable the disclosed process to correct itself when arrived queries are inadequate. Choosing a very large adaptation interval, on the other hand, ensures enough test queries will be available for each invocation but will delay drift detection. Since det_drft has a small overhead, we recommend invoking the disclosed process frequently.

Figure 2:
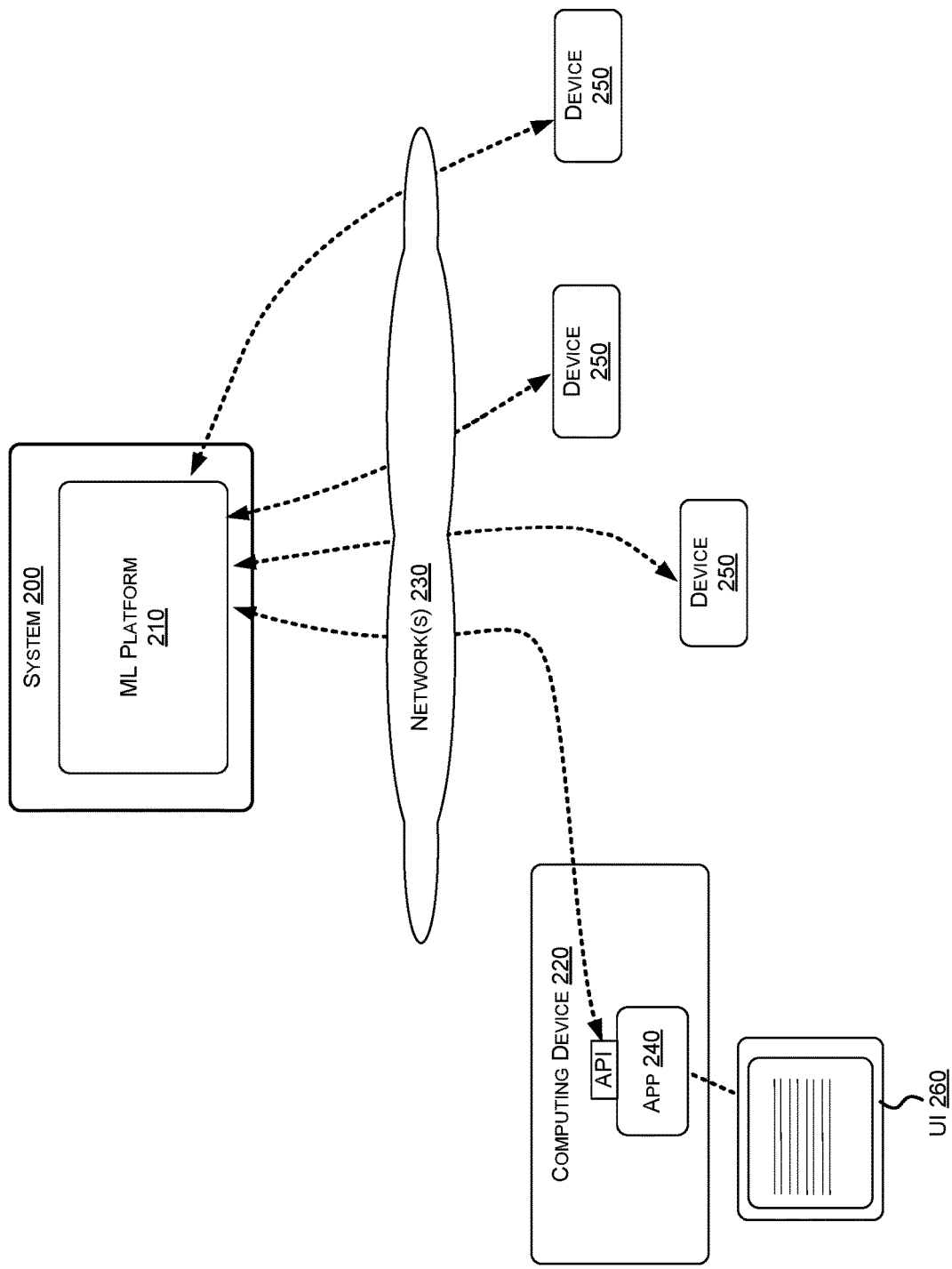
FIG. 2 is a diagram showing aspects of an example system according to one embodiment disclosed herein.

In the example system illustrated in FIG. 2, a system 200 is illustrated that implements a machine learning (ML) platform 210. The ML platform 210 may be configured to provide output data to various devices 250 over a network 230, as well as computing device 220. A user interface 260 may be rendered on computing device 220. The user interface 260 may be provided in conjunction with an application 240 that communicates to the ML platform 210 using an API via network 230. In some embodiments, system 200 may be configured to provide product information to users. In one example, ML platform 210 may implement a machine learning system to perform one or more tasks. The ML platform 210 utilize the machine learning system to perform tasks such as image and writing recognition. The machine learning system may be configured to be optimized using the techniques described herein.

Figure 3:
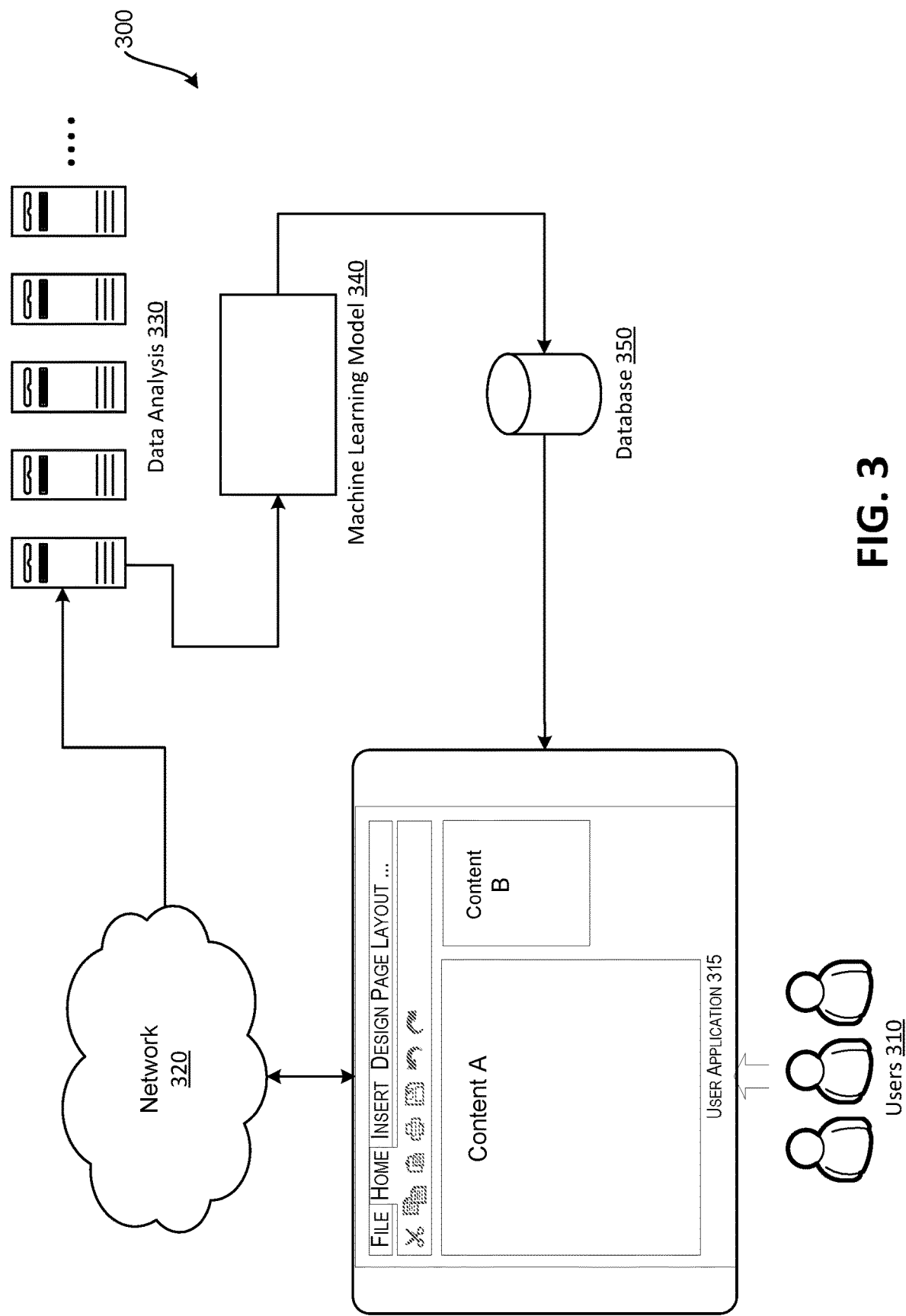
FIG. 3 is a diagram showing aspects of an example system according to one embodiment disclosed herein.

FIG. 3 is a computing system architecture diagram showing an overview of a system disclosed herein for implementing a machine learning model, according to one embodiment disclosed herein. As shown in FIG. 3, a machine learning system 300 may be configured to perform analysis and perform identification, prediction, or other functions based upon various data collected by and processed by data analysis components 330 (which might be referred to individually as an "data analysis component 330" or collectively as the "data analysis components 330"). The data analysis components 330 may, for example, include, but are not limited to, physical computing devices such as server computers or other types of hosts, associated hardware components (e.g., memory and mass storage devices), and networking components (e.g., routers, switches, and cables). The data analysis components 330 can also include software, such as operating systems, applications, and containers, network services, virtual components, such as virtual disks, virtual networks, and virtual machines. The database 350 can include data, such as a database, or a database shard (i.e., a partition of a database). Feedback may be used to further update various parameters that are used by machine learning model 340. Data may be provided to the user application 315 to provide results to various users 310 using a user application 315. In some configurations, machine learning model 340 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 4:
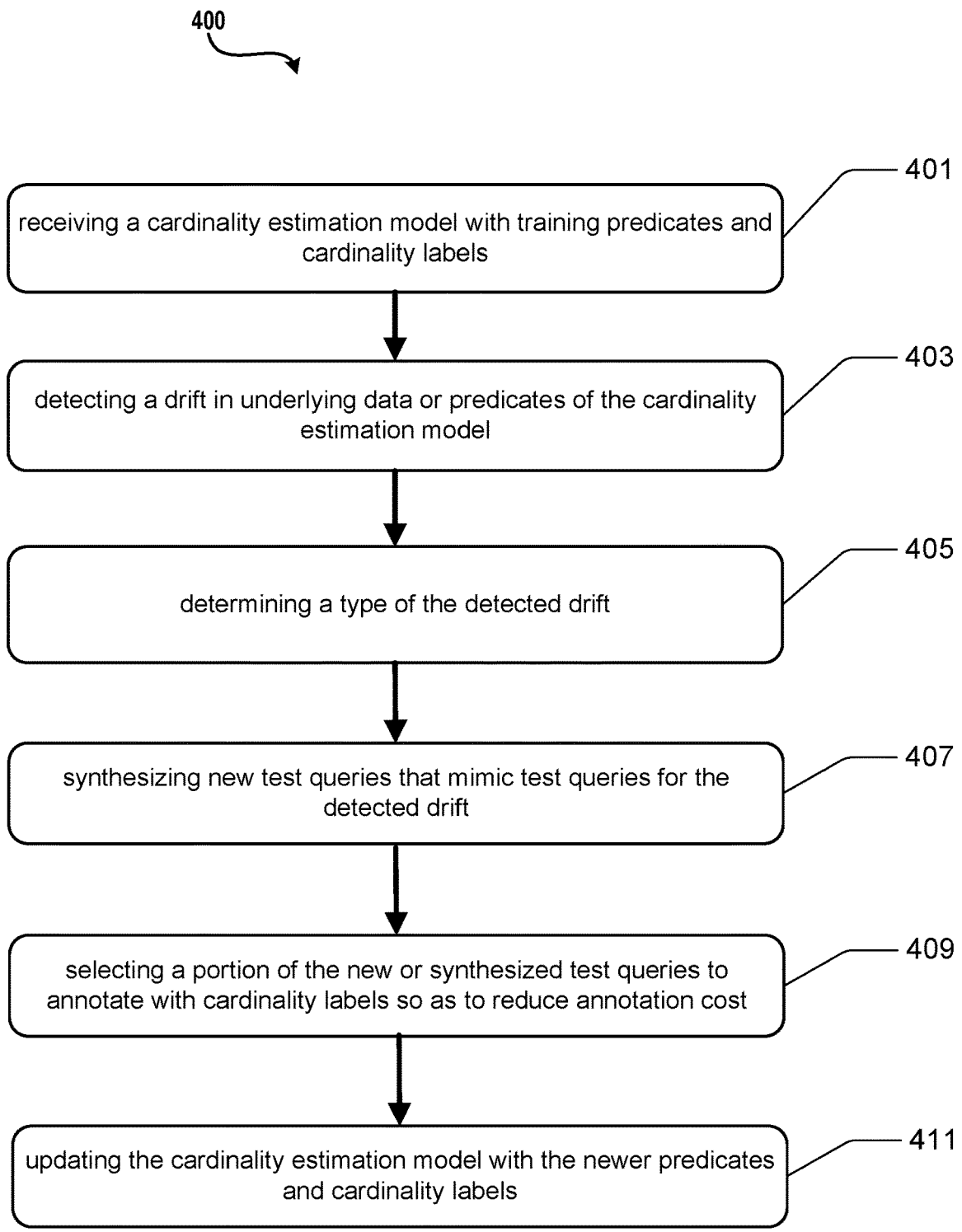
FIG. 4 is a flow diagram showing aspects of an illustrative routine, according to one embodiment disclosed herein.

Turning now to FIG. 4, illustrated is an example operational procedure for updating a trained cardinality estimation model in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 4, operation 401 illustrates receiving a cardinality estimation model with training predicates and cardinality labels.

Operation 401 may be followed by operation 403. Operation 403 illustrates detecting a drift in underlying data or predicates of the cardinality estimation model.

Operation 403 may be followed by operation 405. Operation 405 illustrates determining a type of the detected drift.

Operation 405 may be followed by operation 407. Operation 407 illustrates based on the type of the detected drift, synthesizing new test queries that mimic test queries for the detected drift.

Operation 407 may be followed by operation 409. Operation 409 illustrates selecting a portion of the new or synthesized test queries to annotate with cardinality labels so as to reduce annotation cost.

Operation 409 may be followed by operation 411. Operation 411 illustrates updating the cardinality estimation model with newer predicates and cardinality labels.

Figure 5:
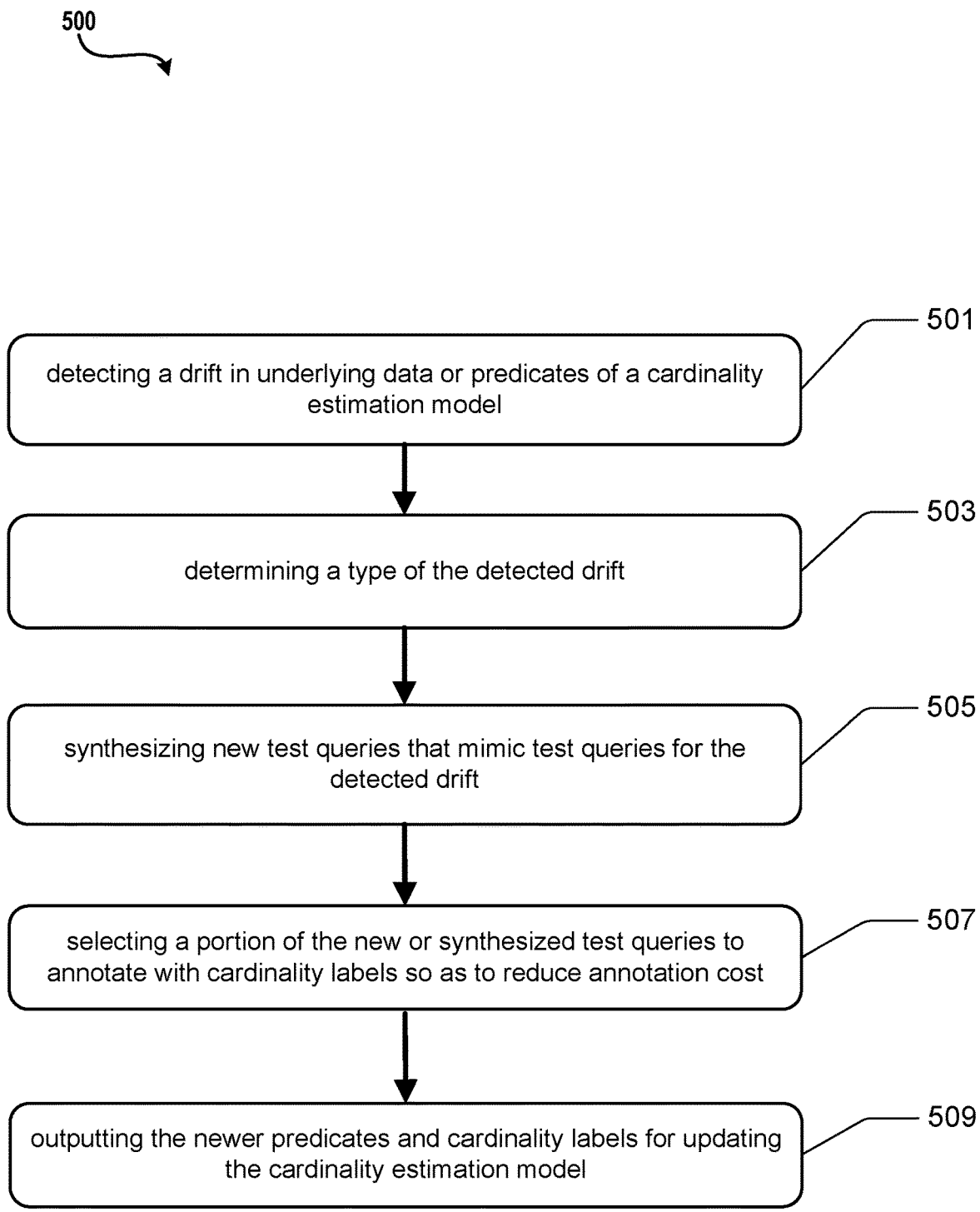
FIG. 5 is a flow diagram showing aspects of an illustrative routine, according to one embodiment disclosed herein.

Turning now to FIG. 5, illustrated is another example operational procedure for updating a trained cardinality estimation model in accordance with the present disclosure. The operational procedure may be implemented in a system comprising one or more computing devices.

Referring to FIG. 5, operation 501 illustrates detecting a drift in underlying data or predicates of a cardinality estimation model.

Operation 501 may be followed by operation 503. Operation 503 illustrates determining a type of the detected drift.

Operation 503 may be followed by operation 505. Operation 505 illustrates based on the type of the detected drift, synthesizing new test queries that mimic test queries for the detected drift.

Operation 505 may be followed by operation 507. Operation 507 illustrates selecting a portion of the new or synthesized test queries to annotate with cardinality labels so as to reduce annotation cost.

Operation 507 may be followed by operation 509. Operation 509 illustrates outputting newer predicates and cardinality labels for updating the cardinality estimation model.

Figure 6:
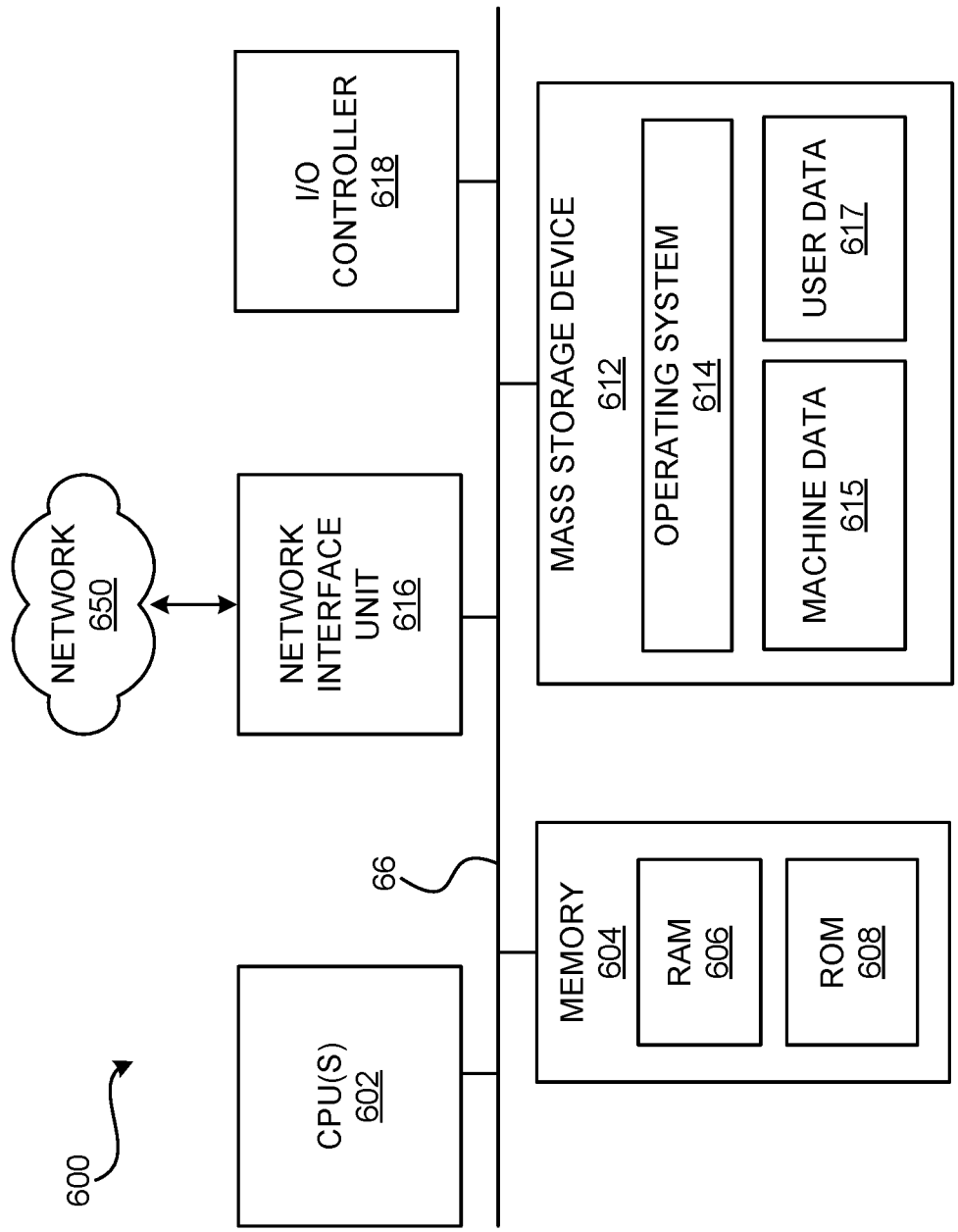
FIG. 6 is a computer architecture diagram illustrating aspects of an example computer architecture for a computer capable of executing the software components described herein.

FIG. 6 shows an example computer architecture for a computer capable of providing the functionality described herein such as, for example, a computing device configured to implement the functionality described above with reference to FIGS. 1-5. Thus, the computer architecture 600 illustrated in FIG. 6 illustrates an architecture for a server computer or another type of computing device suitable for implementing the functionality described herein. The computer architecture 600 might be utilized to execute the various software components presented herein to implement the disclosed technologies.

The computer architecture 600 illustrated in FIG. 6 includes a central processing unit 602 ("CPU"), a system memory 604, including a random-access memory 606 ("RAM") and a read-only memory ("ROM") 608, and a system bus 66 that couples the memory 604 to the CPU 602. A firmware containing basic routines that help to transfer information between elements within the computer architecture 600, such as during startup, is stored in the ROM 608. The computer architecture 600 further includes a mass storage device 612 for storing an operating system 614, other data, such as machine data 615 or user data 616.

The mass storage device 612 is connected to the CPU 602 through a mass storage controller (not shown) connected to the bus 66. The mass storage device 612 and its associated computer-readable media provide non-volatile storage for the computer architecture 600. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various implementations, the computer architecture 600 might operate in a networked environment using logical connections to remote computers through a network 650 and/or another network (not shown). A computing device implementing the computer architecture 600 might connect to the network 650 through a network interface unit 616 connected to the bus 66. It should be appreciated that the network interface unit 616 might also be utilized to connect to other types of networks and remote computer systems.

The computer architecture 600 might also include an input/output controller 618 for receiving and processing input from a number of other devices, including a keyboard, mouse, or electronic stylus (not shown in FIG. 6). Similarly, the input/output controller 618 might provide output to a display screen, a printer, or other type of output device (also not shown in FIG. 6).

It should be appreciated that the software components described herein might, when loaded into the CPU 602 and executed, transform the CPU 602 and the overall computer architecture 600 from a general-purpose computing system into a special-purpose computing system customized to facilitate the functionality presented herein. The CPU 602 might be constructed from any number of transistors or other discrete circuit elements, which might individually or collectively assume any number of states. More specifically, the CPU 602 might operate as a finite-state machine, in response to executable instructions contained within the software modules disclosed herein. These computer-executable instructions might transform the CPU 602 by specifying how the CPU 602 transitions between states, thereby transforming the transistors or other discrete hardware elements constituting the CPU 602.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 might include other types of computing devices, including hand-held computers, embedded computer systems, personal digital assistants, and other types of computing devices known to those skilled in the art.

It is also contemplated that the computer architecture 600 might not include all of the components shown in FIG. 6, might include other components that are not explicitly shown in FIG. 6, or might utilize an architecture completely different than that shown in FIG. 6. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 7:
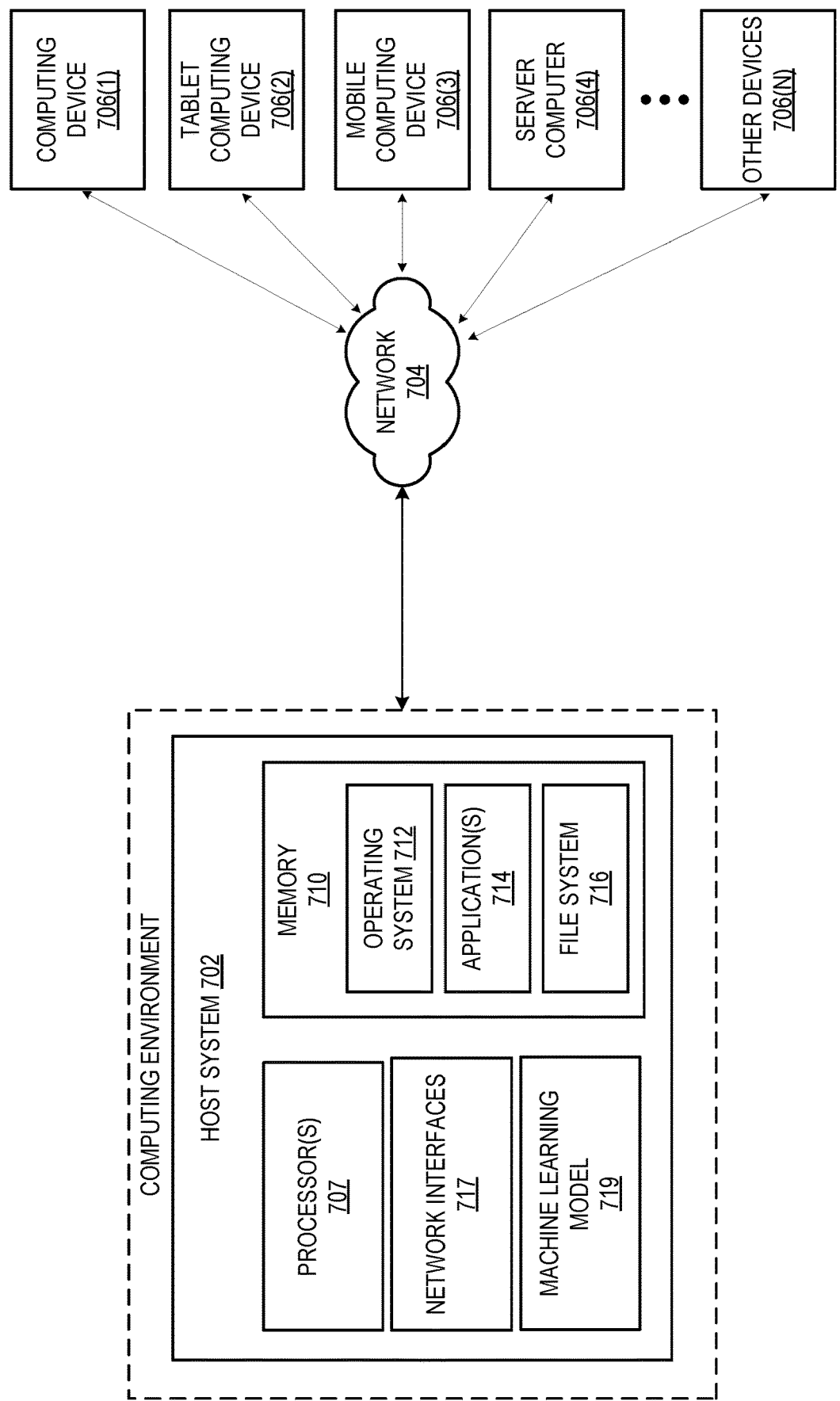
FIG. 7 is a data architecture diagram showing an illustrative example of a computer environment.

FIG. 7 illustrates an example computing environment capable of executing the techniques and processes described above with respect to FIGS. 1-6. In various examples, the computing environment comprises a host system 702. In various examples, the host system 702 operates on, in communication with, or as part of a network 704.

The network 704 can be or can include various access networks. For example, one or more client devices 706(1) . . . 706(N) can communicate with the host system 702 via the network 704 and/or other connections. The host system 702 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 702 can be provided by one or more servers that are executing as part of, or in communication with, the network 704. A server can host various services, virtual machines, portals, and/or other resources. For example, a can host or provide access to one or more portals, Web sites, and/or other information.

The host system 702 can include processor(s) 707 memory 710. The memory 710 can comprise an operating system 712, application(s) 714, and/or a file system 716. Moreover, the memory 710 can comprise the storage unit(s) 72 described above with respect to FIGS. 1-5.

The processor(s) 707 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 710.

The memory 710 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 702 can communicate over the network 704 via network interfaces 717. The network interfaces 717 can include various types of network hardware and software for supporting communications between two or more devices. The host system 702 may also include machine learning model 719.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method of updating a trained cardinality estimation model implemented in a computing system, the method comprising:
receiving a cardinality estimation model with training predicates and cardinality labels;
detecting a drift in underlying data or predicates of the cardinality estimation model;
determining a type of the detected drift;
based on the type of the detected drift, synthesizing new test queries that mimic test queries for the detected drift;
selecting a portion of the new or synthesized test queries to annotate with cardinality labels so as to reduce annotation cost; and
updating the cardinality estimation model with the newer predicates and cardinality labels.

Clause 2: The method of clause 1, wherein the detecting is performed periodically.

Clause 3: The method of any of clauses 1-2, wherein the detecting is performed when an evaluation error of the cardinality estimation model on the test queries exceeds a threshold beyond the error observed during training.

Clause 4: The method of any of clauses 1-3, wherein the determining the type of the detected drift comprises counting a fraction of rows that are new or have changed since the cardinality estimation model was last trained and measuring a change in ground truth cardinality for one or more canary predicates.

Clause 5: The method of any of clauses 1-4, wherein the determining the type of the detected drift comprises determining that the number of new queries available is below the number of annotated queries necessary to train the cardinality estimation model or when an insufficient number of queries have ground truth labels.

Clause 6: The method of any of clauses 1-5, further comprising:
injecting newly arrived predicates into a query pool;
computing and using embeddings for the query predicates;

updating a generator and discriminator if synthetic queries are needed; and
updating the embeddings.

Clause 7: The method of clauses 1-6, further comprising determining a plurality of types of the drifts.

Clause 8: The method of any of clauses 1-7, further comprising using learned embeddings of query predicates to decouple adaptation components from featurizations used by the cardinality estimation model.

Clause 9: The method of any of clauses 1-8, further comprising synthesizing new query predicates using predicate embeddings in the query pool.

Clause 10: The method of any of clauses 1-9, further comprising receiving a predicate embedding as input and predicting whether a given predicate resembles a training, test, or generated workload.

Clause 11: A computing system, comprising:
one or more processors; and
a computer-readable storage medium having computer-executable instructions stored thereupon which, when executed by the processor, cause the computing system to perform operations comprising:
detecting a drift in underlying data or predicates of a cardinality estimation model;
determining a type of the detected drift;
based on the type of the detected drift, synthesizing new test queries that mimic test queries for the detected drift;
selecting a portion of the new or synthesized test queries to annotate with cardinality labels so as to reduce annotation cost; and
outputting the newer predicates and cardinality labels for updating the cardinality estimation model.

Clause 12: The system of clause 11, wherein the determining the type of the detected drift comprises counting a fraction of rows that are new or have changed since the cardinality estimation model was last trained, and measuring a change in ground truth cardinality for one or more canary predicates.

Clause 13: The system of any of clauses 11 and 12, wherein the determining the type of the drift comprises determining that the number of new queries available is below the number of annotated queries necessary to train the cardinality estimation model or when an insufficient number of queries have ground truth labels.

Clause 14: A computer-readable storage medium having computer-executable instructions stored thereupon which, when executed by one or more processors of a computing device, cause the computing device to perform operations comprising:
detecting a drift in underlying data or predicates of a cardinality estimation model;
determining a type of the detected drift;
based on the type of the detected drift, synthesizing new test queries that mimic test queries for the detected drift;
selecting a portion of the new or synthesized test queries to annotate with cardinality labels so as to reduce annotation cost; and
outputting the newer predicates and cardinality labels for updating the cardinality estimation model.

Clause 15: The computer-readable storage medium of clause 14, further comprising computer-executable instructions stored thereupon which, when executed by one or more processors of a computing device, cause the computing device to perform operations comprising:
injecting newly arrived predicates into a query pool;
computing embeddings for the newly arrived predicates;
updating a generator and discriminator if synthetic queries are needed; and
updating the embeddings.

Clause 16: The computer-readable storage medium of any of clauses 14 and 15, further comprising computer-executable instructions stored thereupon which, when executed by one or more processors of a computing device, cause the computing device to perform operations comprising:
using learned embeddings of query predicates to decouple components from featurizations used by the cardinality estimation model.

Clause 17: The computer-readable storage medium of any of the clauses 14-16, further comprising computer-executable instructions stored thereupon which, when executed by one or more processors of a computing device, cause the computing device to perform operations comprising:
synthesizing new query predicates using predicate embeddings in the query pool.

Clause 18: The computer-readable storage medium of any of the clauses 14-17, further comprising computer-executable instructions stored thereupon which, when executed by one or more processors of a computing device, cause the computing device to perform operations comprising:
receiving a predicate embedding as input and predicting whether a given predicate resembles a training, test, or generated workload.

Clause 19: The computer-readable storage medium of any of the clauses 14-18, wherein the detecting is performed periodically.

Clause 20: The computer-readable storage medium of any of the clauses 14-19, wherein the detecting is performed when an evaluation error of the cardinality estimation model on the test queries exceeds a threshold beyond the error observed during training.

What is claimed is:

1. A method of updating a trained cardinality estimation model implement in a computing system, the method comprising:
receiving a cardinality estimation model with training predicates and cardinality labels;
detecting a drift in underlying data or predicates of the cardinality estimation model;
determining a type of the detected drift;
based on the type of the detected drift, synthesizing new test queries that mimic test queries for the detected drift;
selecting a portion of the new or synthesized test queries to annotate with cardinality labels so as to reduce annotation cost; and
updating the cardinality estimation model with newer predicates and cardinality labels.

2. The method of claim 1, wherein the detecting is performed periodically.

3. The method of claim 1, wherein the detecting is performed when an evaluation error of the cardinality estimation model on the test queries exceeds a threshold beyond the error observed during training.

4. The method of claim 1, wherein the determining the type of the detected drift comprises counting a fraction of rows that are new or have changed since the cardinality estimation model was last trained and measuring a change in ground truth cardinality for one or more canary predicates.

5. The method of claim 1, wherein the determining the type of the detected drift comprises determining that the number of new queries available is below the number of annotated queries necessary to train the cardinality estimation model or when an insufficient number of queries have ground truth labels.

6. The method of claim 1, further comprising:
injecting newly arrived predicates into a query pool;
computing and using embeddings for the query predicates;
updating a generator and discriminator if synthetic queries are needed; and
updating the embeddings.

7. The method of claim 1, further comprising determining a plurality of types of the drifts.

8. The method of claim 6, further comprising using learned embeddings of query predicates to decouple adaptation components from featurizations used by the cardinality estimation model.

9. The method of claim 6, further comprising synthesizing new query predicates using predicate embeddings in the query pool.

10. The method of claim 9, further comprising receiving a predicate embedding as input and predicting whether a given predicate resembles a training, test, or generated workload.

11. A computing system, comprising:
one or more processors; and
a computer-readable storage medium having computer-executable instructions stored thereupon which, when executed by the processor, cause the computing system to perform operations comprising:
detecting a drift in underlying data or predicates of a cardinality estimation model;
determining a type of the detected drift;
based on the type of the detected drift, synthesizing new test queries that mimic test queries for the detected drift;
selecting a portion of the new or synthesized test queries to annotate with cardinality labels so as to reduce annotation cost; and
outputting newer predicates and cardinality labels for updating the cardinality estimation model.

12. The computing system of claim 11, wherein the determining the type of the detected drift comprises counting a fraction of rows that are new or have changed since the cardinality estimation model was last trained, and measuring a change in ground truth cardinality for one or more canary predicates.

13. The computing system of claim 11, wherein the determining the type of the drift comprises determining that the number of new queries available is below the number of annotated queries necessary to train the cardinality estimation model or when an insufficient number of queries have ground truth labels.

14. A computer-readable storage medium having computer-executable instructions stored thereupon which, when executed by one or more processors of a computing device, cause the computing device to perform operations comprising:
detecting a drift in underlying data or predicates of a cardinality estimation model;
determining a type of the detected drift;
based on the type of the detected drift, synthesizing new test queries that mimic test queries for the detected drift;
selecting a portion of the new or synthesized test queries to annotate with cardinality labels so as to reduce annotation cost; and
outputting newer predicates and cardinality labels for updating the cardinality estimation model.

15. The computer-readable storage medium of claim 14, further comprising computer-executable instructions stored thereupon which, when executed by one or more processors of a computing device, cause the computing device to perform operations comprising:
injecting newly arrived predicates into a query pool;
computing embeddings for the newly arrived predicates;
updating a generator and discriminator if synthetic queries are needed; and
updating the embeddings.

16. The computer-readable storage medium of claim 15, further comprising computer-executable instructions stored thereupon which, when executed by one or more processors of a computing device, cause the computing device to perform operations comprising:
using learned embeddings of query predicates to decouple components from featurizations used by the cardinality estimation model.

17. The computer-readable storage medium of claim 15, further comprising computer-executable instructions stored thereupon which, when executed by one or more processors of a computing device, cause the computing device to perform operations comprising:
synthesizing new query predicates using predicate embeddings in the query pool.

18. The computer-readable storage medium of claim 15, further comprising computer-executable instructions stored thereupon which, when executed by one or more processors of a computing device, cause the computing device to perform operations comprising:
receiving a predicate embedding as input and predicting whether a given predicate resembles a training, test, or generated workload.

19. The computer-readable storage medium of claim 14, wherein the detecting is performed periodically.

20. The computer-readable storage medium of claim 14, wherein the detecting is performed when an evaluation error of the cardinality estimation model on the test queries exceeds a threshold beyond the error observed during training.

* * * * *